United States Patent [19]

Inui et al.

[11] Patent Number: 5,586,109

[45] Date of Patent: Dec. 17, 1996

[54] OPTICAL MEMORY HAVING NARROWED TRACK PITCH

[75] Inventors: Tetsuya Inui; Akira Takahashi, both of Nara; Kenji Ohta, Kitakatsuragi-gun; Michinobu Mieda, Shiki-gun; Yoshiteru Murakami, Nishinomiya, all of Japan

[73] Assignee: Sharp Kabushiki Kaisha, Osaka, Japan

[21] Appl. No.: 354,457

[22] Filed: Dec. 12, 1994

Related U.S. Application Data

[63] Continuation of Ser. No. 926,224, Aug. 5, 1992, abandoned.

[30] Foreign Application Priority Data

Aug. 9, 1991 [JP] Japan ................................. 3-200327

[51] Int. Cl.⁶ .................................... G11B 7/24; G11B 3/70
[52] U.S. Cl. ..................... 369/277; 369/275.1; 369/275.4
[58] Field of Search ............................... 369/275.1, 275.2, 369/275.4, 277, 280

[56] References Cited

U.S. PATENT DOCUMENTS

| | | | |
|---|---|---|---|
| 4,385,303 | 5/1983 | Akahira | 369/275.4 |
| 4,680,742 | 7/1987 | Yamada | 369/13 |
| 4,734,904 | 3/1988 | Imanaka | 369/109 |
| 4,817,053 | 3/1989 | Ikeda | 365/113 |
| 4,946,730 | 8/1990 | Inui | 428/64 |
| 5,228,001 | 7/1993 | Birge | 365/215 |

FOREIGN PATENT DOCUMENTS

| | | | |
|---|---|---|---|
| 0038499 | 10/1981 | European Pat. Off. | 369/275.4 |
| 0173533 | 3/1986 | European Pat. Off. | 369/275.4 |
| 0228814 | 7/1987 | European Pat. Off. | 369/275.4 |
| 0336616 | 10/1989 | European Pat. Off. | 369/275.4 |
| 0496358 | 7/1992 | European Pat. Off. | 369/275.4 |
| 100248 | 6/1983 | Japan | 369/275.4 |
| 102347 | 6/1983 | Japan | 369/275.4 |
| 165794 | 11/1983 | Japan | 369/275.4 |
| 11551 | 1/1984 | Japan | 369/275.4 |
| 38943 | 3/1984 | Japan | 369/275.4 |
| 38944 | 3/1984 | Japan | 369/275.4 |
| 147946 | 8/1985 | Japan | 369/275.4 |
| 195751 | 10/1985 | Japan | 428/64 |
| 63-056831 | 3/1988 | Japan | 369/275.4 |
| 2-43380 | 2/1990 | Japan . | |
| 3-108141 | 5/1991 | Japan . | |

OTHER PUBLICATIONS

"High-density magneto-optical disk using a glass substrate" (Papers presented at Kansai District Regular Science Lecture Meeting of Society of Precision Optics, 1988) (Translation of relevant passages provided).

"Optimization of pregroove and prepit shape for the push-pull tracking method" (Proceedings of Symposium on Optical Memory, 1990) (Translation of relevant passages provided).

"Optical pregroove dimensions: design considerations" M. Yamamoto et al. Applied Optics, vol. 25, No. 22, Nov. 15, 1986.

"Magneto-optical disk by contact printing method" T. Inui et al.; SPIE vol. 1078, Optical Data Storage Topical Meeting, 1989.

(List continued on next page.)

*Primary Examiner*—David C. Nelms
*Assistant Examiner*—Son Mai
*Attorney, Agent, or Firm*—David G. Conlin; Brian L. Michaelis

[57] ABSTRACT

A transparent substrate of an optical memory is produced by injection molding using a stamper. Grooves and lands are alternately arranged on the optical memory, for tracking of light converged on the optical memory. The groove width is set in the range of 0.3 μm to 0.4 μm and the groove depth is set in the rage of 80 nm to 100 nm. A decrease in the width of a land at each edge is restrained to 0.2 μm in maximum. With such dimensions, even when the track pitch is set to about 1.4 μm, it is possible to obtain a track crossing signal with intensity sufficient for performing an access operation to a target track. Moreover, since the dimensions bring about an improved reflectance at a land, the optical memory achieves an improved C/N and recording density.

7 Claims, 10 Drawing Sheets

OTHER PUBLICATIONS

Inui et al., "Magneto-Optical Disk by Contact Printing Method" (SPIE-Optical Data Storage Topical Meeting, vol. 1078, 1989) pp. 204–213.

Teruo Murakami, "Design of the Pregrove-Shape on an Optical Disc Based on the Light Diffraction Analysis" (433 Electronics & Communications in Japan 67 (1984) Jun., No. 6, Silver Spring, Maryland, USA) pp. 104–113.

FIG. 1 (b) (PRIOR ART)

FIG.10(a) PUSH-PULL SIGNAL
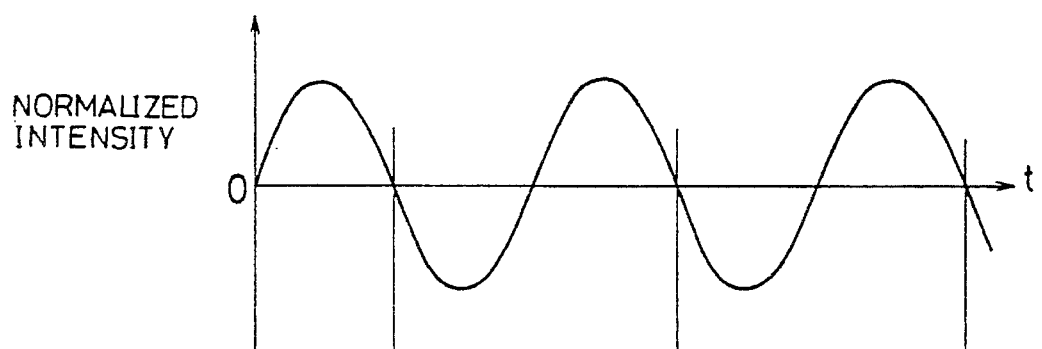
FIG.10(b) TRACK CROSSING SIGNAL
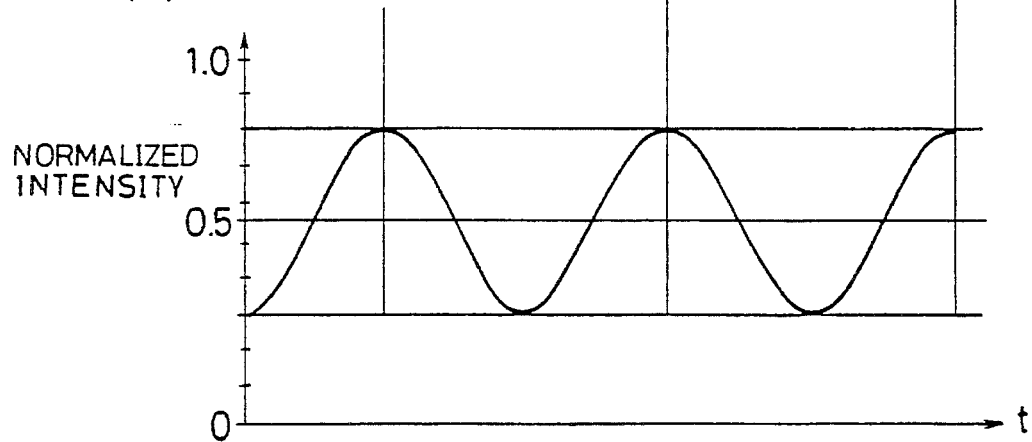

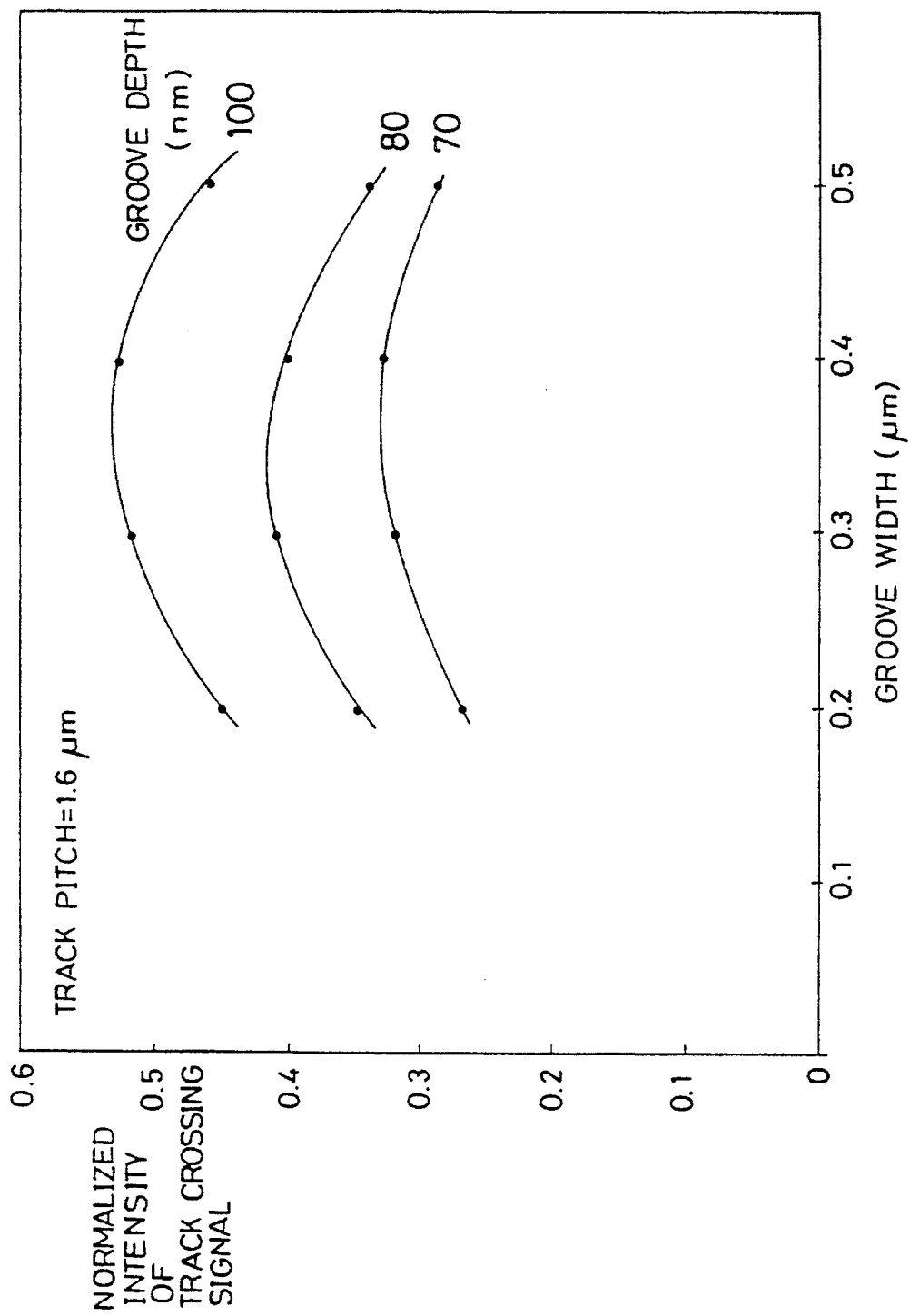

OPTICAL MEMORY HAVING NARROWED TRACK PITCH

This is a continuation of application Ser. No. 07/926,224, filed on Aug. 5, 1992, abandoned.

FIELD OF THE INVENTION

The present invention relates to an optical memory provided with guiding tracks, on/from which information is optically recorded, reproduced or erased.

BACKGROUND OF THE INVENTION

The development of optical memories on/from which information is optically recorded, reproduced or erased is in progress. An optical memory is a recording medium formed by a substrate in the shape of, for example, a disk or a card, covered with a recording material film. In the case of a disk-shaped substrate, spiral or concentric grooves are preformed thereon. The grooves and lands between the grooves form tracks. During recording or reproduction of information, a light spot projected onto an optical memory is controlled to follow the track.

The substrate of the optical memory is produced with the use of a stamper 25 manufactured through the processes shown in FIGS. 8(a) through 8(g). Firstly, as illustrated in FIG. 8(b), a photoresist 21 is applied to the surface of a substrate 20 shown in FIG. 8(a). Secondly, as illustrated in FIG. 8(c), argon laser light 22 is projected onto predetermined portions of the photoresist 21 so as to record tracks. Subsequently, as shown in FIG. 8(d), the photoresist 21 is developed. Next, a nickel film 23 is formed thereon by, for example, sputtering (see FIG. 8(e)), and a nickel layer 24 is then electroformed on the nickel film 23 (see FIG. 8(f)). Finally, the nickel layer 24 is peeled off from the substrate, whereby the stamper 25 on which the track structure is transferred is obtained as illustrated in FIG. 8(g). The substrate of the optical memory is manufactured by injection molding using the stamper 25.

Next, with reference to FIG. 9, the following discusses the structure of an optical pickup. The optical pickup forms a light spot by converging light and directs the light spot to follow the track on an optical disk 31 as an optical memory. As for the optical disk 31, a recording material film 39 is formed on the surface of a substrate 30 manufactured by using the stamper 25.

Light emitted by a semiconductor laser 26 as a light source passes through a shaping prism 27 and a first half prism 28, and is then converged on the recording material film 39 of the optical disk 31 by an objective lens 29. Reflected light from the optical disk 31 is reflected by the first half prism 28 and falls onto a second half prism 32. After falling onto the second half prism 32, the light is separated into two, namely, light directed to a spot lens 36 and light directed to a polarizing beam splitter 33.

The light incident onto the spot lens 36 is directed to pass through a cylindrical lens 37 and is then received by a 4-quadrant photodetector 38. By detecting the difference between the output signals from the left and right halves of the 4-quadrant photodetector 38, a tracking error signal is obtained. The tracking error signal indicates deviation of the light spot from the track center.

Since the light spot is diffracted by the track when traversing the track, the amount of reflected light changes. A track crossing signal is derived from the sum of the output signals from the four detection sections of the 4-quadrant photodetector 38. Namely, the track crossing signal indicates changes in the amount of reflected light when the light spot traverses tracks one after another. When the optical pickup moves to access to a target track, the number of tracks traversed by the light spot is detected by counting the number of times the waveform of the track crossing signal reaches its positive peak value. Then, the optical pickup is positioned according to the detected number.

Meanwhile, the light incident onto the polarizing beam splitter 33 is further separated into two and received by photodetectors 34 and 35, respectively. Accordingly, various other signals are generated.

FIGS. 10(a) and 10(b) illustrate a relation between a push-pull signal (tracking error signal) and a track crossing signal. FIGS. 10(a) and 10(b) indicate the push-pull signal and the track crossing signal produced when the optical pickup moves in a direction and crosses the track, respectively.

There is a phase difference of 90 degrees between the track crossing signal and the push-pull signal, and the phase of the track crossing signal is delayed by 90 degrees with respect to that of the push-pull signal as shown in FIGS. 10(a) and 10(b). The phase difference between the track crossing signal and the push-pull signal varies depending on the moving direction of the optical pickup. If the optical pickup moves in the opposite direction, the phase relation between the track crossing signal and the push-pull signal is inverted and the track crossing signal advances by 90 degrees with respect to the push-pull signal. Thus, the moving direction of the optical pickup is detected by detecting the phase relation between the track crossing signal and the push-pull signal. This makes it easier for the optical pickup to access to a target track.

The track crossing signal and tracking error signal thus obtained vary greatly depending on track parameters, such as the width and depth of grooves forming the tracks and the track pitch. Since the C/N of the signals improves when the reflectance at the track increases, it is desirable to make the reflectance as high as possible.

Moreover, to enhance the recording capacity of the optical memory, recording density must be increased. One of the effective methods to increase the recording density of the optical memory is that increasing the recording density along the track direction while decreasing the track pitch. However, since the track parameters change when the track pitch is decreased, the respective signals derived from the tracks vary significantly. Thus, in order to obtain appropriate signals and reflectance, the track parameters must be designed carefully.

As shown in FIG. 11, the intensity of the track crossing signals was measured with respect to various groove depths and widths. These measurements were carried out using optical memories with a track pitch of about 1.6 μm, an objective lens with a numerical aperture (NA) of 0.55, and laser light with an 830-nm wavelength. The intensity of the track crossing signal is normalized on the basis of the intensity of light reflected from a non-groove portion.

It can be seen from FIG. 11 that the intensity of the track crossing signal becomes maximal when the width of a groove is 0.3 μm to 0.4 μm. Moreover, in the case where the depth of a groove is in the range of 70 nm to 100 nm, the intensity becomes greater as the depth of the groove becomes greater. The sufficient intensity of the track crossing signal varies depending on each system. A groove depth of about 70 nm or more is required in order to obtain a sufficient intensity of, for example, about 0.2 in each system. Thus, when the track pitch is about 1.6 µm, the appropriate width and depth of the groove are about 0.35 µm and 70 nm, respectively.

However, if grooves are formed with the above-mentioned dimensions but with a smaller track pitch, the results shown in FIG. 11 are unlikely expected.

The following document discusses track parameters in detail. The title of the document is "Designing preformed grooves and preformed pits of optimum dimensions for push-pull/tracking servo system", Optical Memory Symposium '90, p. 11. However, this document describes only the track parameters when the track pitch is 1.6 µm and does not mention designing of track parameters with respect to a smaller track pitch.

The dimensions of tracks are described in the following documents. "Optical pregroove dimensions: design considerations", Applied Optics, Vol. 25, No. 22, Nov. 15, 1985, p. 4031; Japanese Publication for Unexamined Patent Application No. 100248/1983, No. 102347/1983, No. 102338/1983, No. 38943/1984, No. 38944/1984 and No. 11551/1984; and Japanese Publication for Unexamined Utility Model Application No. 165794/1983. However, these documents do not discuss track pitch.

The cases where a smaller track pitch is used are described in the following documents. "Magneto-optical disk by contact printing method", SPIE Vol. 1078, Optical Data Storage Topical Meeting, 1989, p. 204; and "High-density magneto-optical disk using a glass substrate", Papers Presented at Kansai District Regular Science Lecture Meeting of Society of Precision Optics, 1988, p. 107. However, since optimization of track parameters was not performed according to those documents, some problems arise. Namely, the access operation can not be performed with accuracy, because the level of the track crossing signal is lowered when the track pitch becomes smaller.

Next, problems associated with the manufacturing methods of the stamper 25 of FIG. 8 are discussed below. The light spot of the argon laser light 22, which is used when manufacturing the stamper 25, normally has Gaussian distribution or a similar intensity distribution. Namely, a distribution where the light intensity continuously decreases from the center of the light spot outward and it decreases gradually, in particular, at the circumferential section of the light spot.

Therefore, when recording is performed with the argon laser light 22 having such an intensity distribution, the developed photoresist 21 has curved edges. As a result, when substrates for optical memories are produced through injection molding using such a stamper 25, the edges of the lands on these substrates are curved because of the intensity distribution of the argon laser light 22.

Thus, during recording or reproducing of information, when the optical pickup projects a light spot onto the optical memory whose lands have narrowed flat portions due to the curved land edges, the reflectance at the tracks on the optical memory decreases. Consequently, the quality of the signals deteriorates.

SUMMARY OF THE INVENTION

An object of the present invention is to provide an optical memory having optimum track dimensions which ensure appropriate track crossing signals and reflectance even when the track pitch is narrowed so as to improve recording density.

In order to achieve the above-mentioned objective, an optical memory of the present invention incorporates a substrate provided with tracks formed by arranging grooves and lands alternately. The grooves and lands are provided so as to perform tracking of light when it is converged on the optical memory. The grooves and lands are formed such that the groove width is in the range of 0.3 µm to 0.4 µm, the groove depth is in the range of 80 nm to 100 nm, and that the maximum limit for a decrease in the width of the land at each edge is 0.2 µm.

By setting the groove width and the groove depth within these ranges, even when the track pitch is narrowed to about 1.4 µm, it is possible to obtain a track crossing signal with intensity sufficient for performing an accurate access operation to a target track. Moreover, since the decrease in the flat portion of the land is restrained, the reflectance at the land increases, achieving satisfactory signal quality.

To restrain the decrease in the flat portion of the land, it is desirable to form the grooves by etching a master substrate directly during manufacturing of the master substrate.

For a fuller understanding of the nature and advantages of the invention, reference should be made to the ensuing detailed description taken in conjunction with the accompanying drawings.

BRIEF DESCRIPTION OF THE DRAWINGS

FIGS. 10(*a*) and 10(*b*) are graphs illustrating the waveforms of a push-pull signal and a track crossing signal obtained by the optical pickup of FIG. 9.

FIG. 11 is a graph illustrating the relation between the groove width and depth and the intensity of a track crossing signal when the track pitch is about 1.6 µm.

DESCRIPTION OF THE EMBODIMENT

With reference to FIGS. 1 through 7, an embodiment of the present invention is described below.

Figure 1:
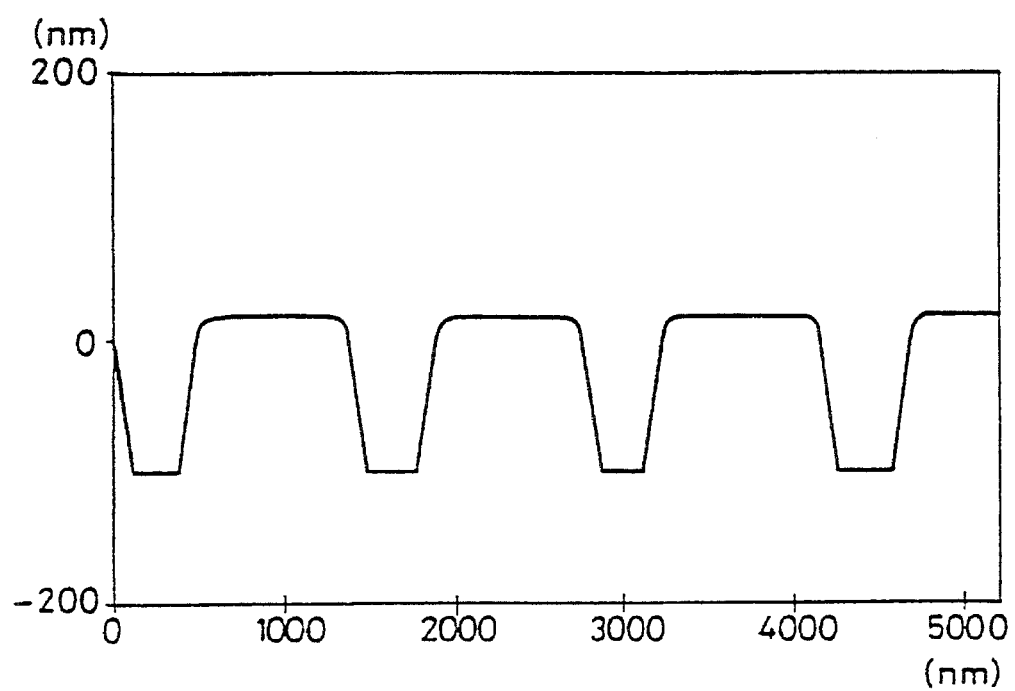
FIG. 1(*a*) is a graph illustrating the profile of the substrate of an optical memory of the present invention, and FIG. 1(*b*) is a graph illustrating that of an optical memory of a conventional type.
Figure 1:
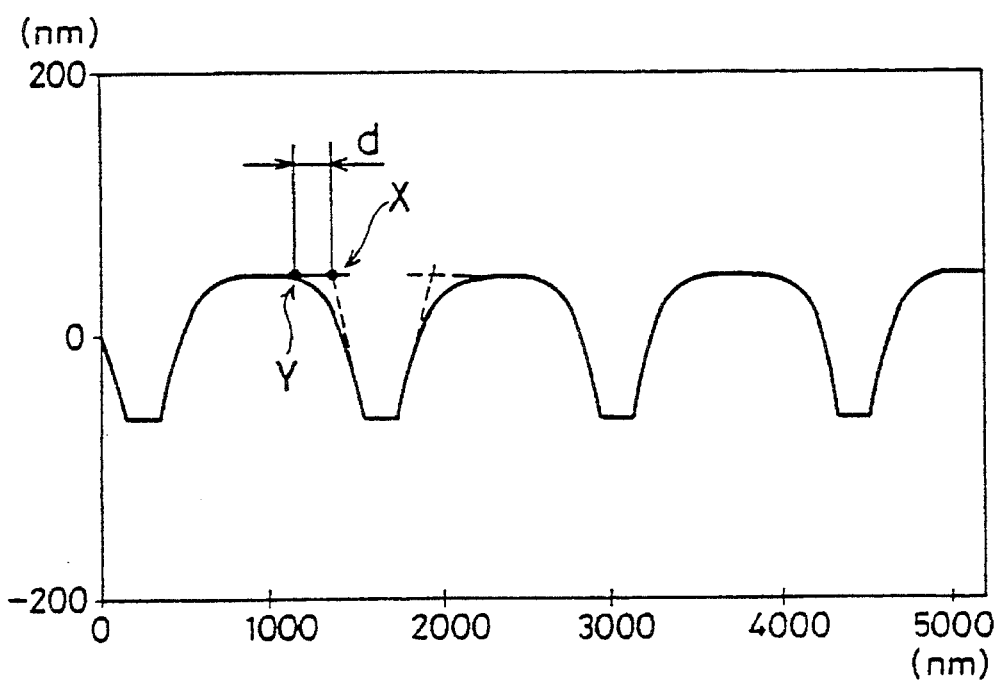
Figure 2:
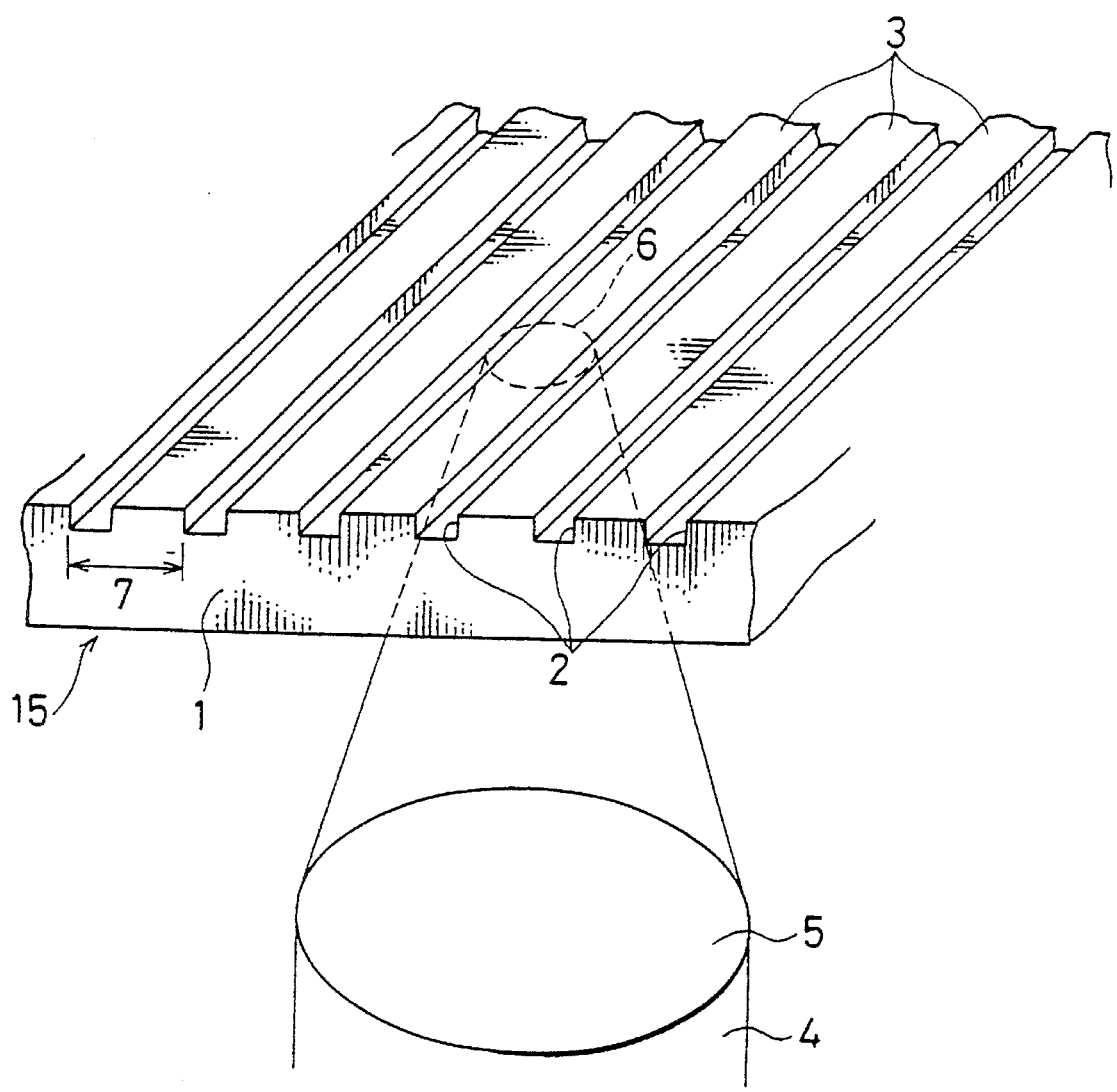
FIG. 2 is an enlarged perspective view of part of an optical memory having the profile shown in FIG. 1(*a*).

As illustrated in FIG. 2, when manufacturing an optical memory 15 according to this embodiment, spiral or concentric grooves 2 are formed on the surface of a transparent substrate 1 of the optical memory 15. For example, the transparent substrate 1 is made from a polycarbonate resin or an amorphous polyolefine resin. In this embodiment, a land 3 formed between two adjacent grooves 2 is used as a recording track. The track pitch 7 is given by adding the width of a single groove 2 and that of a land 3. Instead of a conventional track pitch of about 1.6 μm, in this embodiment the track pitch 7 is set to about 1.4 μm.

Laser light 4 emitted by a light source, not shown, is directed to the optical memory with the above-mentioned dimensions and is converged into a light spot 6 on the land 3 by an objective lens 5. It is also possible to converge the light spot 6 on the groove 2 if the groove 2 is used as a recording track, instead of the land 3. In this case, since the relation between the groove 2 and the land 3, to be described later, is unchanged, similar results are expected.

The numerical aperture (NA) of the objective lens 5 is set to about 0.5 to 0.55, and the wavelength of the laser light 4 is set in the range from 780 nm to 830 nm. An excessively great NA causes increases in the size and the weight of the objective lens 5, and tracking of the light spot 6 to be affected by the tilts of the transparent substrate 1 and the objective lens 5. Therefore, in order to make the light spot 6 accurately follow the recording track on the optical memory 15 by using the objective lens 5 with a large NA, the system must satisfy stricter requirements with respect to mechanical precision. Consequently, the manufacturing cost of the system increases.

Regarding the wavelength of the laser light 4, a shorter wavelength is more suitable for high-density recording. However, in order to obtain laser light of a short wavelength, a large gas laser or a semiconductor laser which is expensive and hard to obtain is required. On the other hand, if the NA of the objective lens 5 and the wavelength of the laser light 4 are in the above-mentioned ranges, it is possible to use a semiconductor laser and an objective lens 5 which are compact, less expensive, and easy to obtain. This makes it possible to constitute a system which is less expensive overall.

Figure 3A:
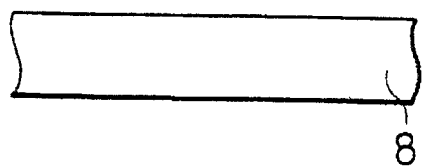
FIGS. 3(*a*) through 3(*i*) are depictions illustrating the processes of manufacturing a stamper used for producing the optical memory of the present invention.
Figure 3B:
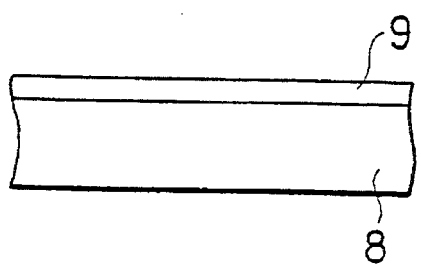
Figure 3C:
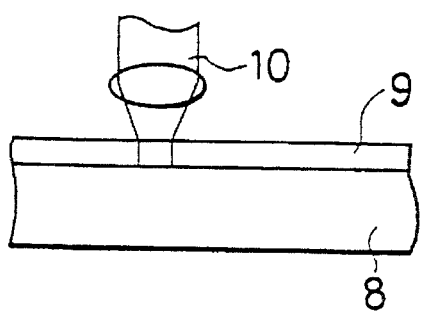
Figure 3D:
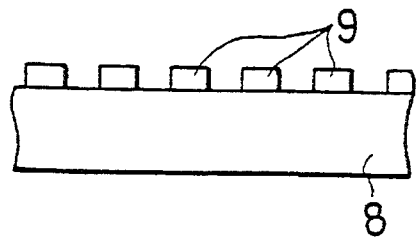
Figure 3E:
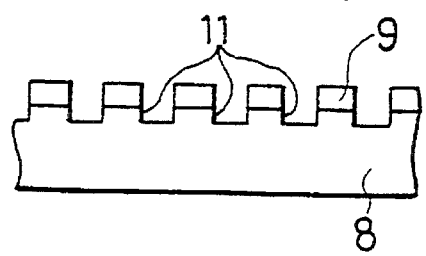
Figure 3F:
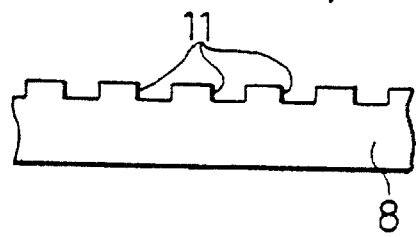
Figure 3G:
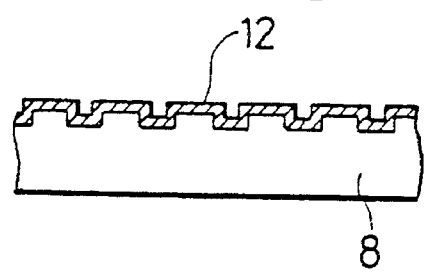
Figure 3H:
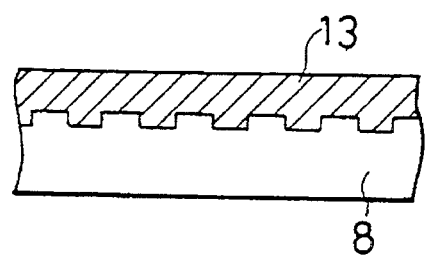
Figure 3I:
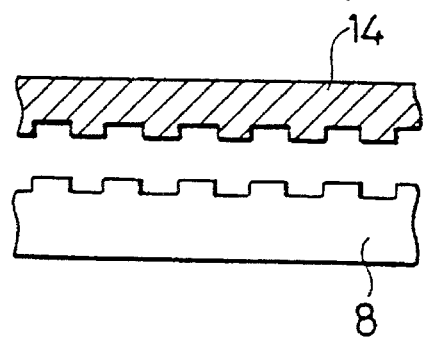

For the manufacturing of the transparent substrate 1, for example, a stamper 14 of FIG. 3(i) is used. With reference to FIGS. 3(a) through 3(i), the following explains the manufacturing processes of the stamper 14.

Firstly, as illustrated in FIG. 3(b), a photoresist 9 is applied to the surface of a quarts substrate 8 shown in FIG. 3(a). Secondly, as illustrated in FIG. 3(c), argon laser light 10 is applied to predetermined portions on the photoresist 9 so as to record recording tracks and control signals necessary for accessing to target tracks. The control signals are recorded in the form of pits.

Then, the photoresist 9 is developed as shown in FIG. 3(d). Subsequently, as illustrated in FIG. 3(e), portions, which are not covered with the photoresist 9 and thus where the quarts substrate 8 is exposed, are etched with the dry etching method. A gas composed mainly of a fluorine compound such as carbon tetrafluoride ($CF_4$) is used for etching. Through the etching process, grooves 11 are formed directly on the quarts substrate 8. This process is controlled so as to make the width and depth of the grooves 11 within predetermined ranges, to be described later. Moreover, as to be described later, this etching process restrains the edges of the lands 3 formed on the transparent substrate 1 from being curved.

Next, as illustrated in FIG. 3(f), the photoresist 9 is removed from the quarts substrate 8. Then, a nickel film 12 is formed on the surface of the quarts substrate 8, for example, by sputtering as shown in FIG. 3(g). Subsequently, a nickel layer 13 is electroformed as shown in FIG. 3(h). Finally, as illustrated in FIG. 3(i), by peeling off the nickel layer 13 from the quarts substrate 8, the stamper 14 having thereon the negatively transferred grooves and lands is obtained. And, the transparent substrate 1 shown in FIG. 2 is produced by injection molding using the stamper 14.

Also formed on the surface of the transparent substrate 1 is a recording layer (not shown) on/from which information is optically recorded, reproduced or erased. As for a material for the recording layer, for example, the following are listed: a magneto-optical recording material using magneto-optical effects; a phase-change material using a phase change between crystal and amorphous; a write-once material using pits formed by recording energy; and a recording material using photochromic effects.

Figure 7:
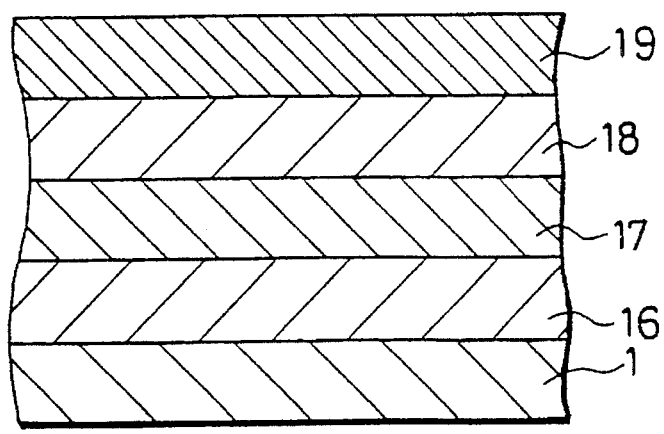
FIG. 7 is an enlarged vertical sectional view of the optical memory, and the results shown in FIG. 6 were obtained by using this optical memory.
Figure 8A:
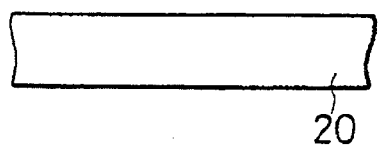
FIGS. 8(*a*) through 8(*g*) are depictions illustrating the processes of manufacturing a stamper used for producing a conventional optical memory.
Figure 8B:
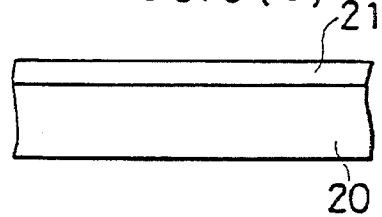
Figure 8C:
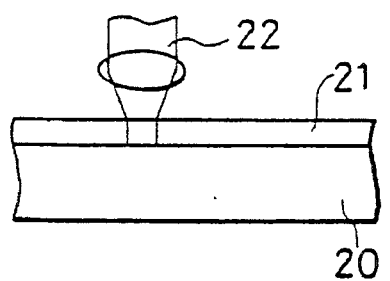
Figure 8D:
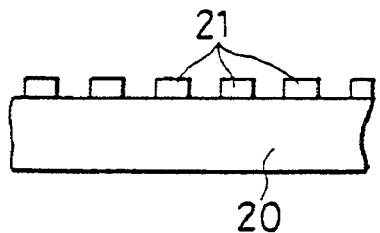
Figure 8E:
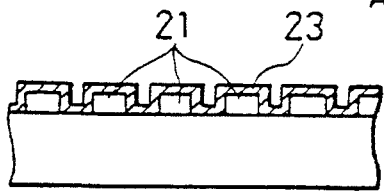
Figure 8F:
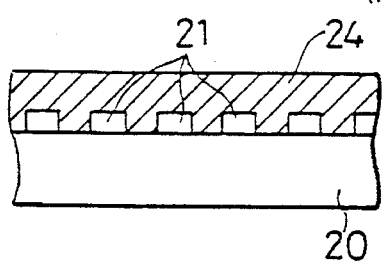
Figure 8G:
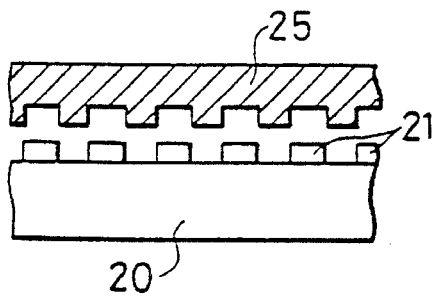
Figure 9:
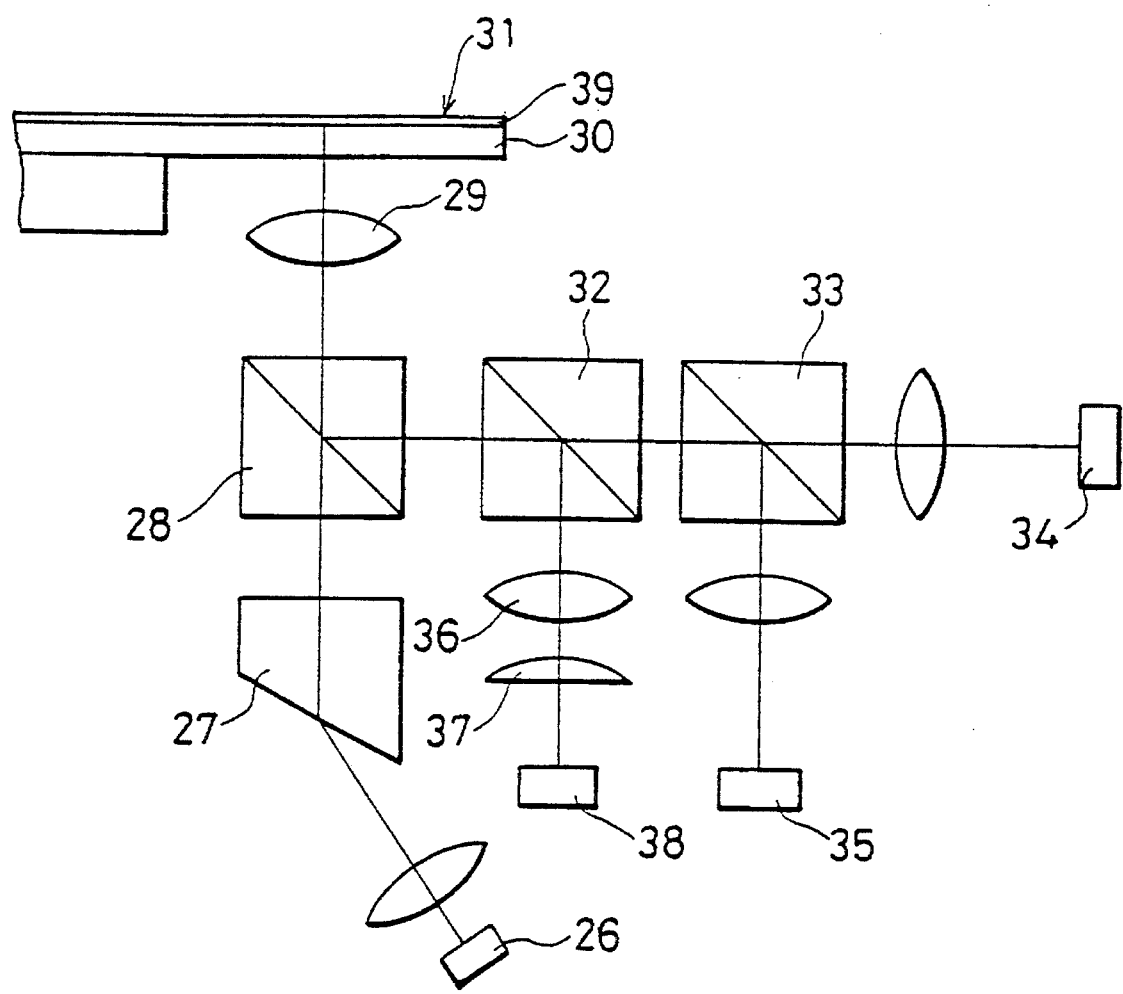
FIG. 9 is a depiction illustrating the structure of a conventional optical pickup.

As illustrated in FIG. 7, this embodiment uses a recording layer of magneto-optical type. The magneto-optical recording layer is composed of four films, AlN 16, DyFeCo 17, AlN 18 and Al 19, formed in this order on the substrate 1 by sputtering. The thickness of each of the films 16–19, is 80 nm, 20 nm, 20 nm, and 30 nm, respectively. The DyFeCo 17 is an amorphous alloy film with a composition of $Dy_{23.5}(Fe_{78}Co_{22})_{76.5}$.

Various optical memories having a track pitch of about 1.4 μm and different groove depths and groove widths were produced. Experiments were carried out to measure the intensity of the track crossing signals derived from these optical memories, and the results are shown in FIG. 4.

Figure 4:
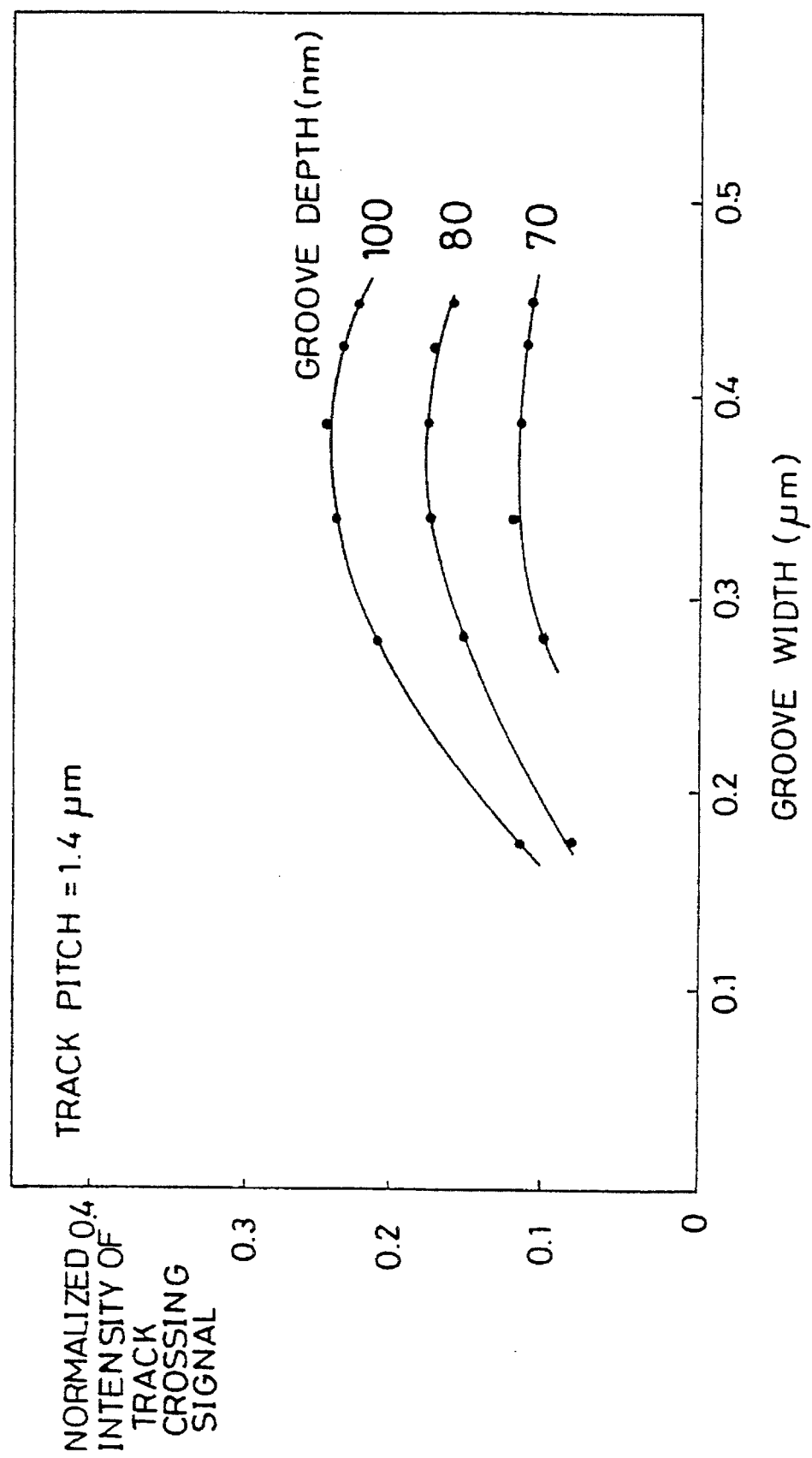
FIG. 4 is a graph illustrating the relation between the groove width and depth and the intensity of a track crossing signal when the track pitch is about 1.4 µm.

In FIG. 4, the horizontal axis represents the widths of the grooves, while the vertical axis indicates the intensity of the track crossing signals which is normalized on the basis of the intensity of a track crossing signal derived by projecting light onto a flat portion having no groove. As is seen from FIG. 4, the track crossing signal with the maximum intensity is obtained when the groove width is in the range of 0.3 μm to 0.4 μm.

Besides, if a comparison is made between the intensity of a track crossing signal from the optical memory with the conventional track pitch of about 1.6 μm (see FIG. 11) and that from the optical memory with the track pitch of about 1.4 μm, it can be seen that the intensity of the track crossing signal is significantly lowered as a whole when the track pitch is 1.4 μm. When the track pitch is about 1.4 μm and the groove depth is 70 nm, the intensity of the track crossing signal is particularly lowered to have the maximum intensity of about 0.12. To perform an accurate access operation to a target track, such intensity is insufficient.

Therefore, when the track pitch is made about 1.4 μm, it is not appropriate to form grooves with dimensions similar to the dimensions designed for the track pitch of about 1.6 μm. Accordingly, in order to obtain a track crossing signal with sufficient intensity, the groove depth must be made greater than 80 nm.

Figure 5:
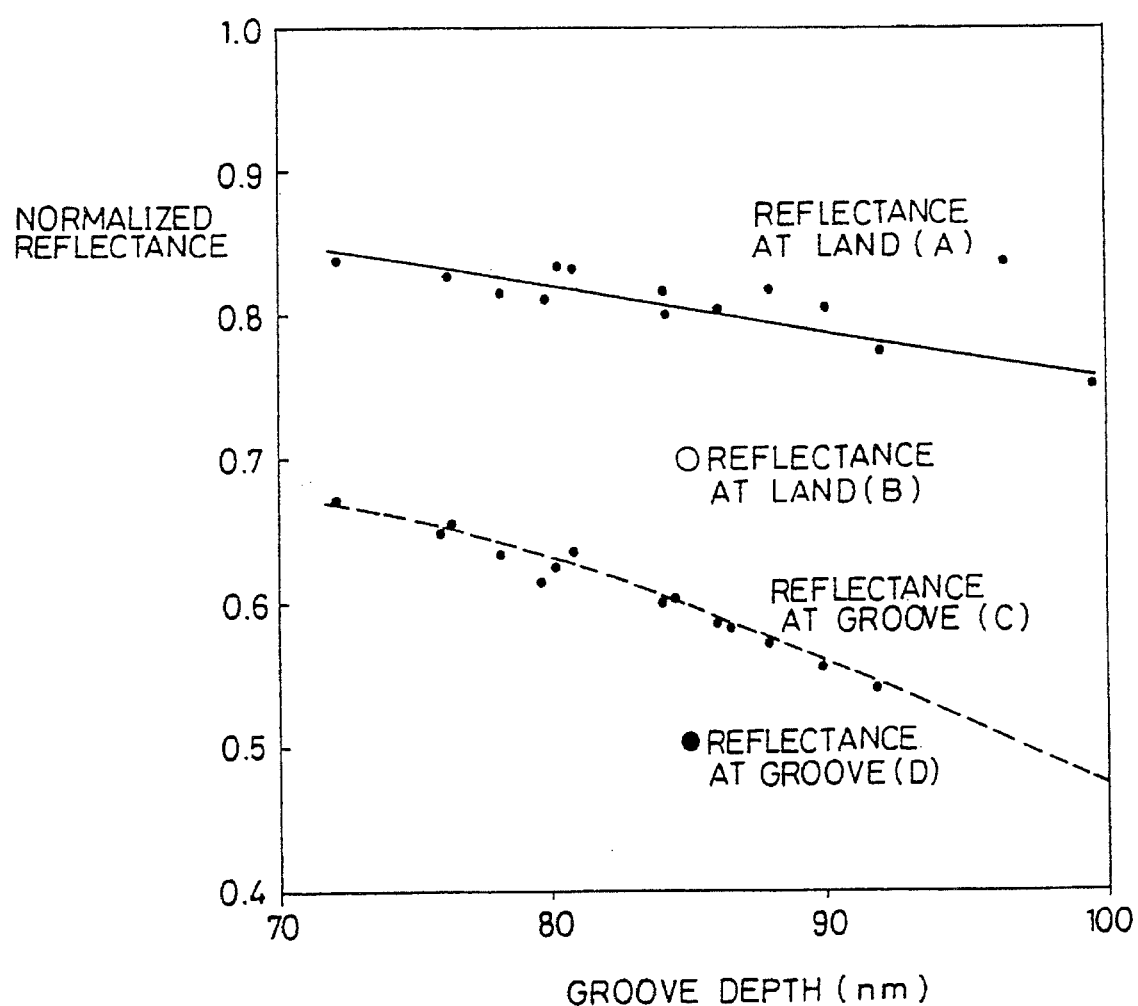
FIG. 5 is a graph illustrating the relation between the reflectance at the land and groove and the groove depth.

Next, optical memories having a groove width of about 0.35 μm, a track pitch of about 1.4 μm and different groove depths were produced through the processes described above. Reflectance with respect to these optical memories was measured, and the results are shown in FIG. 5. The solid line and the dotted line in the drawing indicate the reflectance (A) at a land and the reflectance (C) at a groove, respectively.

Also, using the stamper 25 manufactured through the conventional processes shown in FIG. 8, an optical memory with a groove width of about 0.35 μm, a track pitch of about 1.4 μm and a groove depth of about 85 nm was produced.

Then, its reflectance was measured. o in FIG. 5 shows the reflectance (B) at a land of this conventional-type optical memory, while ● indicates the reflectance (D) at a groove.

The amplitude of the track crossing signal is correlated with the difference between the reflectance at the land and the reflectance at the groove. FIG. 5 indicates that, in both the optical memory of this embodiment and the conventional-type optical memory, the difference between the reflectance at a land and the reflectance at a groove is about 0.2. Namely, there is not much difference in the amplitudes of the track crossing signals between these optical memories. However, when the groove depth is 85 nm, the reflectance at a land is about 0.7 in the case of the conventional-type optical memory, while it becomes higher to about 0.8 with respect to the optical memory of this embodiment. With the present invention, as described above, since the reflectance at the land becomes higher, the C/N ratio improves, resulting in high-quality signals.

Figure 6:
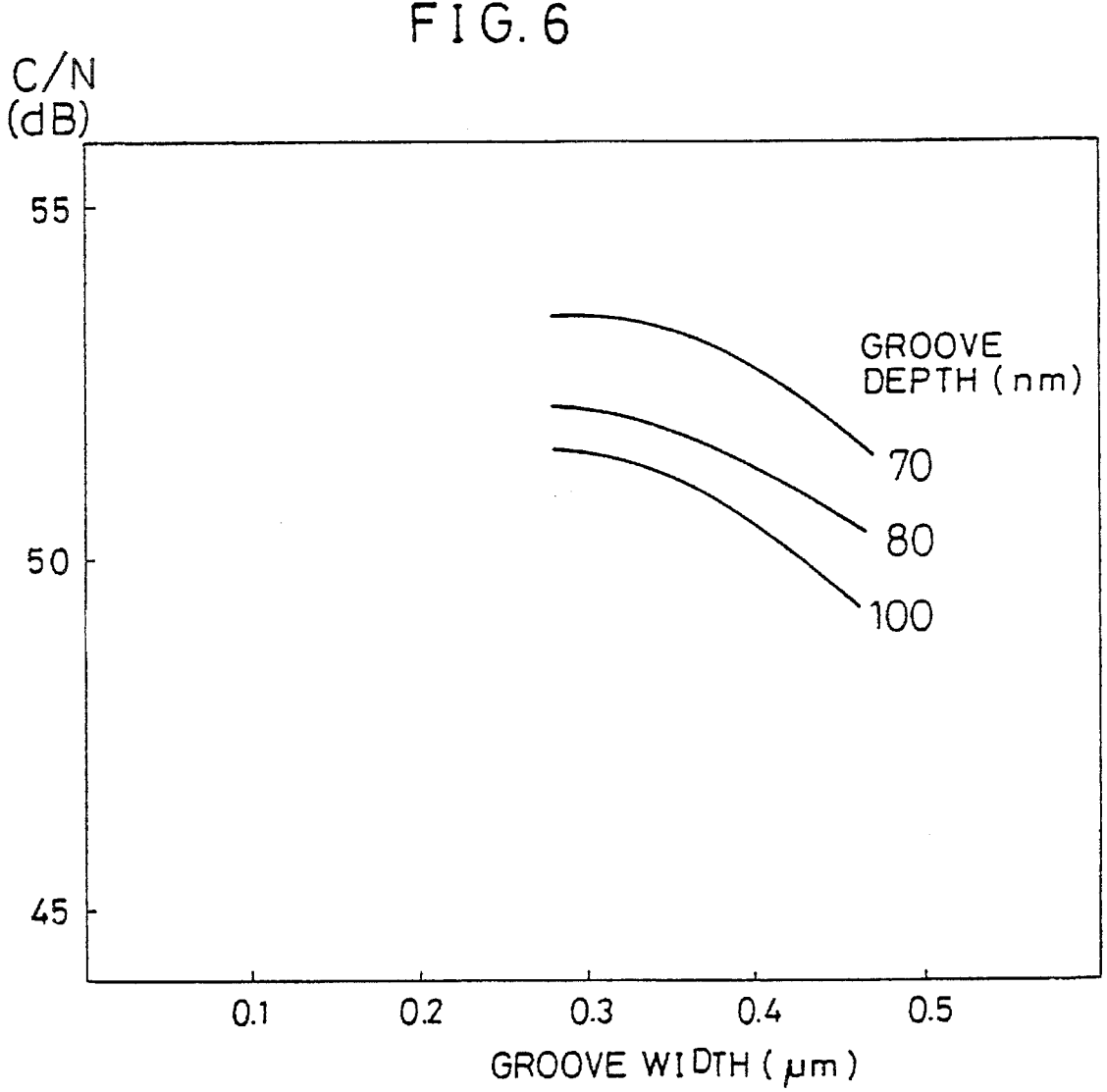
FIG. 6 is a graph illustrating the relation between the groove width and depth and the C/N.

FIG. 6 illustrates the relation between the C/N and the depth and width of grooves. As a result of the relation between the reflectance and the groove depth shown in FIG. 5, the C/N improves as the depth of groove decreases. It can also be seen that the C/N improves as the width of groove decreases or as the width of land increases.

The reasons for the improvement of the reflectance at the land is discussed below. FIG. 1(a) shows the profile of the grooves of the optical memory of this embodiment, measured by an STM (scanning type tunnel microscope). FIG. 1(b) illustrates the profile of the grooves of the conventional-type optical memory, measured by the STM.

As illustrated in FIG. 1(b), the degree of curving of the edges of the land is expressed by a distance d between X and Y, where X is the intersection point of the extended oblique line of the groove and the line extended from the top of the land and Y is the contact point of the top and the edge. As the distance d increases, the edges of the land become more rounded and the flat portion thereof decreases. In the case of the conventional-type optical memory, the distance d is about 0.2 μm. On the other hand, on the optical memory of the present invention, since the edges of the land are not rounded much, a decrease in the flat portion of the land is very little.

As described above, the roundness of the edges of the land is greatly owing to the intensity distribution of the argon laser light used in the production of the stamper. Therefore, as illustrated in FIG. 3, a stamper 14 is produced using the quarts substrate 8 on which grooves are directly etched. Then, as shown in FIG. 1(a), by performing injection molding, a substrate having lands with scarcely reduced flat portions is obtained.

It is found from these results that in order to achieve a satisfactory C/N with a highest possible reflectance at lands, a decrease in the width of the optical memory's land at each edge must be restrained within 0.2 μm.

Considering the above-mentioned results, it is possible to achieve a track crossing signal with sufficient intensity as well as a satisfactory C/N by designing a groove having a width in the range of 0.3 μm to 0.4 μm and a depth in the range of 80 nm to 100 nm and by setting the maximum limit for a decrease in the width of a land at each edge to 0.2 μm. Since these results are not disclosed in any of the above-mentioned publications, these are considered to be novel designing indexes in manufacturing of an optical memory with a smaller track pitch.

Moreover, regarding compact disks and video disks, the track pitch for these disks is usually set to 1.6 μm. However, if the track pitch is set to around 1.4 μm, the track density increases by around 14%, resulting in an improved recording density.

As described above, by setting track parameters based on the designing indexes newly established by the present invention, it is possible to manufacture an optical memory with: (1) an improved recording density; (2) a track crossing signal whose intensity is sufficient for performing an accurate access operation to a target track; and (3) a satisfactory C/N.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical memory, comprising a substrate having thereon tracks formed by alternately arranged grooves and lands, said grooves and lands being provided so as to perform tracking of light converged on said optical memory, wherein, for a track pitch of less than 1.6 μm, a groove width is set in the range of 0.3 μm to 0.4 μm, a groove depth is set in the range of 80 nm to 100 nm, and the maximum limit for a decrease in the width of said land at each edge is set to 0.2 μm, said groove width, groove depth and maximum limit being set to maximize the strength of the track crossing signal and to improve the C/N ratio of said memory.

2. The optical memory according to claim 1, wherein said grooves are formed with a track pitch of 1.4 μm.

3. The optical memory according to claim 1, further comprising a recording layer on or from which information is optically recorded, reproduced and erased, said recording layer being formed on said substrate.

4. The optical memory according to claim 3, wherein said recording layer is made from a magneto-optical material, and wherein information is recorded, reproduced and erased on or from said recording layer by using the magneto-optical effects of said magneto-optical material.

5. The optical memory according to claim 3, wherein said recording layer is made from a phase-change material, and wherein information is recorded, reproduced and erased on or from said recording layer by using a phase change of said phase-change material between crystal and amorphous.

6. The optical memory according to claim 3, wherein said recording layer is made from a write-once type material, and wherein information is recorded, reproduced and erased on or from said recording layer by using pits formed by recording energy.

7. The optical memory according to claim 3, wherein said recording layer is made from a recording material, and wherein information is recorded, reproduced and erased on or from said recording layer by using the photochromic effects of said recording material.

* * * * *

UNITED STATES PATENT AND TRADEMARK OFFICE
CERTIFICATE OF CORRECTION

PATENT NO.  : 5,586,109
DATED       : December 17, 1996
INVENTOR(S) : Inui, et al It is certified that error appears in the above-indentified patent and that said Letters Patent is hereby corrected as shown below:

Please change "quarts" to --quartz-- throughout the text, including at:

Column 5, line 46;

Column 5, line 55;

Column 5, line 59;

Column 5, line 66;

Column 5, line 67;

Column 6, line 4; and

Column 7, line 48.

Signed and Sealed this

Twenty-seventh Day of May, 1997

*Attest:*

BRUCE LEHMAN

*Attesting Officer*    Commissioner of Patents and Trademarks